Patented June 30, 1931

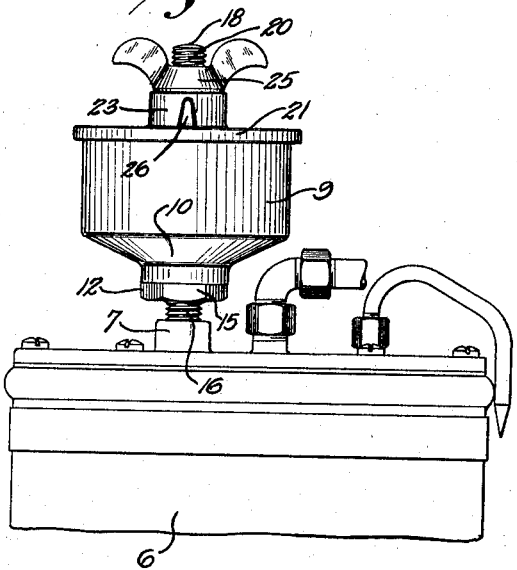
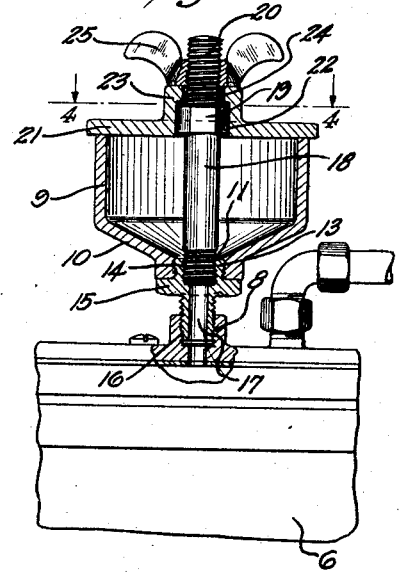
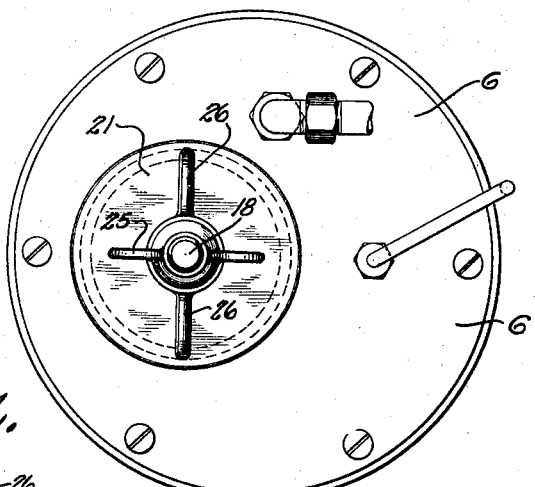
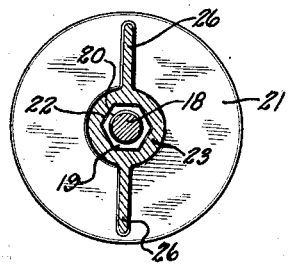

1,812,670

UNITED STATES PATENT OFFICE

WILLIAM F. WAHL, OF MILWAUKEE, WISCONSIN

AUTOMOBILE VACUUM TANK FUNNEL

Application filed May 13, 1929. Serial No. 362,619.

This invention relates to improvements in automobile vacuum tank funnels.

The cover or top portions of automobile vacuum tanks are provided with small tapped openings normally closed by plugs threaded thereinto, and if the gasoline supply for the vehicle becomes exhausted it is necessary to refill the vacuum tank. This is ordinarily accomplished by removing the plug, inserting a funnel into the opening exposed thereby, and then pouring gasoline into the vacuum tank through the funnel. It often happens, however, that a suitable funnel for insertion into the vacuum tank opening is not available, and in that event the refilling of the vacuum tank presents a difficult problem.

It is, therefore, one of the objects of the present invention to provide a vacuum tank funnel device which will be permanently attached within the vacuum tank opening so as to always be available for use.

A further object of the invention is to provide a permanently attached automobile vacuum tank funnel having an easily removable cover and valve arranged so that said cover and valve may be easily and quickly removed by the operator so that they will not interfere with the operation of filling the funnel, and after the vacuum tank has been filled through the funnel, the valve and funnel cover may be quickly and easily replaced and locked in closed position where they will form an air tight enclosure between the funnel and the vacuum tank, and also provide a dust and water tight enclosure for the interior of the funnel.

A further object of the invention is to provide a funnel device for permanent attachment to automobile vacuum tanks with which any vacuum tank may be readily equipped and so shaped and proportioned that it will not interfere with the vehicle engine and associated parts.

A further object of the invention is to provide an automobile vacuum tank funnel which is of very simple construction, is inexpensive to manufacture and install, is strong and durable, and is well adapted for the purposes described.

With the above and other objects in view the invention consists of the improved automobile vacuum tank funnel, and its parts and combinations as set forth in the claims, and all equivalents thereof.

In the accompanying drawings in which the same reference characters indicate the same parts in all of the views:

Fig. 1 illustrates a fragmentary side view of the upper portion of a vacuum tank with the improved funnel installed thereon;

Fig. 2 is a view showing the funnel in vertical section;

Fig. 3 is a plan view of the vacuum tank and funnel installed thereon; and

Fig. 4 is a cross sectional view taken on line 4—4 of Fig. 2.

Referring now more particularly to the drawings, it will appear that the numeral 6 indicates a vacuum tank of the type in common use in motor vehicles and said vacuum tank is provided in its top portion with the usual internally threaded bored boss 7 forming a priming opening 8. Ordinarily said priming opening is closed by a plug threaded thereinto, and to prime a vacuum tank it was formerly necessary to remove the plug, insert a funnel into the priming opening and then pour fuel through the funnel into the vacuum tank.

In the present invention the improved funnel device is adapted to be screwed into said priming opening in replacement of the plug and therefore provides an integral permanently attached priming funnel for the vacuum tank. Said funnel device includes a cup-shaped body portion 9 with its bottom portion inclined from its periphery to its medial portion, as indicated at 10 and formed with a central aperture 11. A bottom member 12 has a portion 13 extending into the medial bottom portion of the cup-shaped member and said portion 13 has an internally threaded bore 14 registering with said central aperture 11. Depending from an intermediate hexagonal portion 15 of said bottom member is an externally threaded stem 16 formed with a bore 17 of less diameter than the bore 14 but communicating therewith. Said stem 16 is adapted to be screwed into the threaded opening 8 of the vacuum tank, as in the drawing, and the hexagonal portion 15 permits the application of a tool for this purpose.

The central aperture 11 is adapted to be normally closed by an elongated shank 18 extended centrally through the cup-shaped body portion 9 and having its lower threaded end portion 18' threaded into said opening 11. The upper portion of said shank is formed with an outwardly projecting hexagonal portion 19 and thereabove is a reduced threaded portion 20.

The open upper end portion of the cup-shaped body portion is normally tightly closed by a removable cover 21, which cover is of a slightly greater diameter than the diameter of the upper end portion of said cup-shaped body and is adapted to seat on the rim thereof. Said cover is formed with a central hexagonal opening 22 engageable with the hexagonal portion 19 of the shank 18 and immediately above said opening 22 the cover is formed with an upstanding boss 23 having an opening 24 therethrough slightly smaller than said hexagonal opening and registering therewith, said opening 24 also being of slightly greater diameter than the diameter of the threaded portion 20 of the shank. As shown in Figs. 1 and 2, when the cover 21 is seated on the body portion the portion 19 of the shank 18 lodges within the hexagonal opening 22 of the cover and the upper end portion 20 of the shank extends through the opening 24 of the boss 23. A winged nut 25 is threaded onto said shank portion 20 for clamping purposes. Also the upper surface of the cover is provided with a pair of radial fins 26 for manipulation of said cover.

In use, the funnel device is positioned on a vacuum tank, as shown, and the cover is securely clamped thereon. The cover may be readily so positioned by threading the shank portion 18' into the threaded opening 11 and in this manipulation, the engagement between the hexagonal opening 22 of the cover and the portion 19 of the shank will permit the cover being operated as a tool and it is turned down until it seats tightly on the body portion. Then, it is locked in this position by turning the winged nut 25 down as far as possible. As so positioned, the cover securely closes the top of the body portion and it cannot work loose nor rattle, and the shank closes the opening 11 to the vacuum tank. If it becomes necessary to prime the vacuum tank, the winged nut 25 is first unloosened, and then the cover is turned, with its hexagonal portion engaging the hexagonal portion of the shank, to unthread said shank from the opening 11, whereupon the cover and shank may be completely removed to permit the introduction of gasoline into the vacuum tank through said funnel device.

From the foregoing description it will be seen that the improved automobile vacuum tank funnel is both simple and novel, and is well adapted for the purposes described.

What is claimed as the invention is:

1. A funnel device, comprising a funnel shaped body portion having a depending bored stem lodgable in the priming opening of a vacuum tank, a shank extending centrally into said body portion with its lower end portion seated in and closing said bored stem, a cover mounted on said shank and operatively engaging the same for turning purposes and seated on and closing the open end of said body portion, and a clamping member mounted on the outer end portion of said shank.

2. A funnel device, comprising a funnel shaped body portion having a depending bored stem lodgable in the priming opening of a vacuum tank, a shank extending centrally into said body portion with its lower end portion in threaded engagement with said bored stem and closing the same, and a cover having a flat under-surface tightly seated on the upper end of the body portion, said shank extending centrally through said cover and the cover having a turnable engagement therewith.

3. A funnel device, comprising a funnel shaped body portion having a depending bored stem adapted to be screwed into the priming opening of a vacuum tank, a shank extending centrally into said body portion with its lower end portion threaded into said bored stem and closing the same, an intermediate portion of said shank being enlarged and of angular formation, a cover tightly and detachably seated on the upper end of the body and having a central angular socket portion and reduced opening entering thereinto, said shank extending through said socket portion and reduced opening of the cover with the angular portion of the shank lodged within the socket portion of the cover, and a clamping nut threaded onto the outer end portion of said shank.

4. A funnel device, comprising a cup-shaped body portion having a depending bored stem adapted to be screwed into the priming opening of a vacuum tank, an elongated shank extending centrally into said body portion with its lower end portion threaded into said bored stem and closing the same, an intermediate portion of said shank being enlarged and of angular formation, a cover tightly and detachably seated on the upper end of said body portion and formed with a central boss, said boss having therein an angular socket-like opening and a reduced opening, said shank extending through said boss with its angular portion in turnable engagement with the socket-like opening of the boss, and a clamping nut threaded onto the outer end portion of said shank.

In testimony whereof, I affix my signature.

WILLIAM F. WAHL.